Patented June 29, 1926.

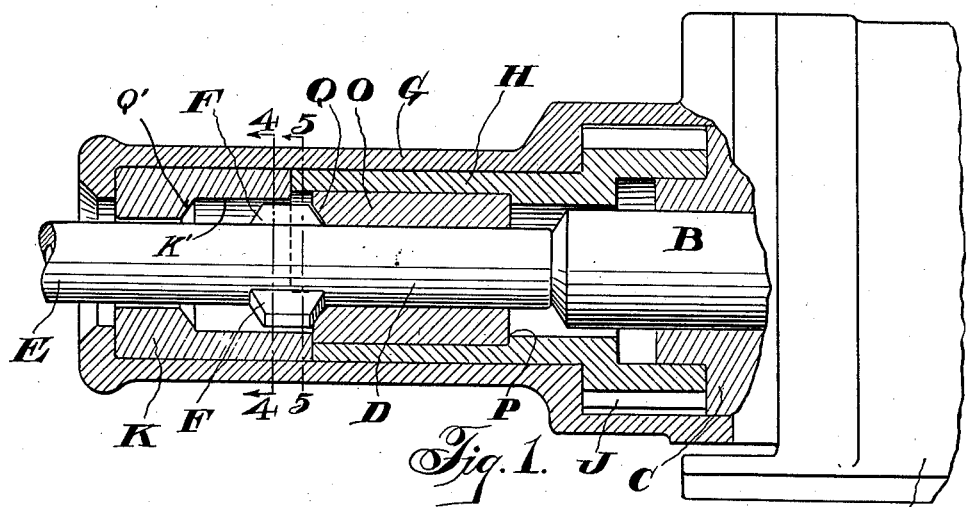
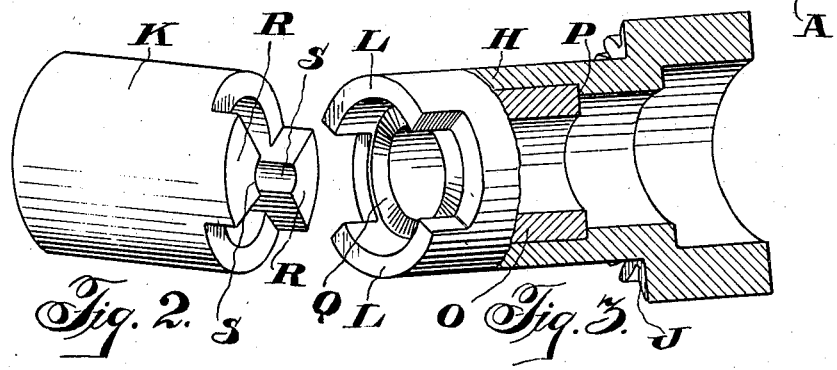
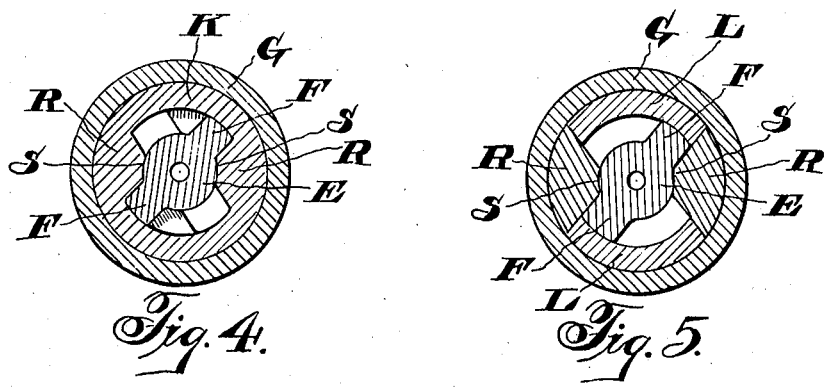

1,590,222

UNITED STATES PATENT OFFICE.

LEWIS CONDICT BAYLES AND FRED M. SLATER, OF EASTON, PENNSYLVANIA, ASSIGNORS TO INGERSOLL-RAND COMPANY, OF JERSEY CITY, NEW JERSEY, A CORPORATION OF NEW JERSEY.

LUG CHUCK FOR ROCK DRILLS.

Application filed May 2, 1922. Serial No. 557,963.

This invention relates to fluid actuated rock drills of the hammer type, but more particularly to a lug chuck for such machines adapted to receive lug steel and impart rotation thereto.

The objects of the invention are to simplify and strengthen the chuck, enable the parts of the chuck to be readily assembled in the machine and disassembled, and produce a construction in which wear and breakage are reduced to a minimum.

Our improved lug chuck is capable of use with any form of automatic rotation, in which a chuck sleeve is rotated, for imparting rotation to the drill steel having lugs which engage a chuck driver, but in the present instance, we have chosen to show a chuck having a gear adapted to be rotated by means of any suitable independent rotation motor.

In the drawings, which illustrate the invention in one of its preferred forms,

Figure 1 is a longitudinal sectional elevation partly broken away of the front head of a rock drill embodying the invention, Figure 2 is a perspective view of the driver, Figure 3 is a perspective view partly broken away and partly in longitudinal section of the chuck sleeve, Figure 4 is a transverse sectional view on the line 4—4 of Figure 1 looking in the direction of the arrows, Figure 5 is a transverse sectional view on the line 5—5 of Figure 1, looking in the direction of the arrows.

Referring to the drawings, A represents the cylinder of a fluid actuated rock drill of the hammer type, having the reciprocating hammer piston B adapted to extend through the front cylinder washer C and impart blows of impact to the shank D of the drill steel E having the lugs F.

The chuck parts are contained within the front head G and include the chuck sleeve H adapted to be rotated as by means of the gear J and impart rotation to the drill steel by means of the driver K, which is formed with a recessed portion K', into which the lugs F of the drill steel extend.

The chuck sleeve H is provided at its forward end with clutch jaws L and a removable cylindrical chuck bushing O formed with smooth unbroken end faces and without jaws is located within the forward end of the sleeve H and seated against an internal shoulder P on said sleeve. The shank D of the drill steel extends through and is guided in the chuck bushing O in position to receive the impact blows of the hammer piston B. The clutch jaws L on the chuck sleeve H as indicated particularly in Figure 3 preferably extend forwardly beyond the end Q of the chuck bushing O, and the driver K is provided with clutch jaws R cooperating with the clutch jaws L. The driver K as shown is also provided with internal lugs S which are adapted to impart rotation to the drill steel and are preferably formed in alignment with and as a part of the driver clutch jaws and terminating at the outer ends of said driver clutch jaws R. The forward end Q of the chuck bushing O is preferably beveled as indicated in the figures, in order to receive the beveled surface of the lugs F on the drill steel, and the forward end of the recessed portion K' is beveled at Q' to form an abutment for the drill steel lugs.

In accordance with our invention, so far described, the removable chuck bushing O forms a bearing and guide for the shank of the drill steel and this bushing protects the chuck sleeve and may be renewed if necessary, without replacing the entire chuck sleeve. The integral shoulder P within the chuck sleeve H resists the rearward thrust and impact of the steel at times against the chuck bushing O and forms a simple and strong construction. By extending the clutch jaws L of the chuck sleeve H forwardly beyond the end of the chuck bushing O, the lugs S on the driver K may be formed in alignment with the clutch jaws R on the driver, and a simple and strong construction is thus provided at this point. As shown, the driving lugs S are adapted to seat against the periphery of the outer end of the chuck bushing O.

We claim:

1. A lug chuck for fluid actuated rock drills of the hammer type, comprising a chuck sleeve adapted to be rotated and having clutch jaws at its forward end, a removable cylindrical chuck bushing formed with smooth unbroken end faces and seated within the forward end of said sleeve against an internal integral shoulder on said sleeve, the shank of the drill steel being adapted to extend through the chuck bushing in position to receive the impact blows of the hammer piston of the machine, a driver having clutch jaws cooperating with the clutch jaws at the forward end of the chuck sleeve, said driver also being formed with a recessed portion into which the drill steel lugs are adapted to extend, and driving lugs for engaging the drill steel lugs within said recessed portion of the driver and adapted to seat against the periphery of the outer end of the chuck bushing.

2. A lug chuck for fluid actuated rock drills of the hammer type, comprising a chuck sleeve adapted to be rotated and having clutch jaws at its forward end, a removable cylindrical chuck bushing formed with smooth unbroken end faces and seated within the forward end of said sleeve against an internal integral shoulder on said sleeve, the forward unbroken end of the chuck bushing terminating at the base of the lugs on the chuck sleeve, the shank of the drill steel being adapted to extend through the chuck bushing in position to receive the impact blows of the hammer piston of the machine, a driver having clutch jaws cooperating with the clutch jaws at the forward end of the chuck sleeve, said driver also being formed with a recessed portion into which the drill steel lugs are adapted to extend, and driving lugs for engaging the drill steel located within said recessed portion of the driver and terminating at the outer ends of the driver clutch jaws, whereby the said driving lugs are adapted to seat against the periphery of the outer end of the chuck bushing.

In testimony whereof we have signed this specification.

LEWIS CONDICT BAYLES.
FRED M. SLATER.